(12) United States Patent
Park et al.

(10) Patent No.: US 10,108,212 B2
(45) Date of Patent: Oct. 23, 2018

(54) DIGITAL LOW DROP-OUT VOLTAGE CONTROLLER INCLUDING EMBEDDED DUAL-LOOP FEEDBACK FOR MINIMUM ENERGY POINT OPERATION

(71) Applicant: Intel Corporation, Santa Clara, CA (US)

(72) Inventors: Sunghyun Park, Hillsboro, OR (US); Stephen Kim, Hillsboro, OR (US); Krishnan Ravichandran, Saratoga, CA (US); Sriram R. Vangal, Hillsboro, OR (US); Vivek K. De, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 14/861,997

(22) Filed: Sep. 22, 2015

(65) Prior Publication Data

US 2017/0083033 A1  Mar. 23, 2017

(51) Int. Cl.
| | | |
|---|---|---|
| *G05F 1/575* | (2006.01) | |
| *G05F 1/59* | (2006.01) | |
| *H02M 1/00* | (2006.01) | |
| *H02M 1/08* | (2006.01) | |

(52) U.S. Cl.
CPC .............. *G05F 1/575* (2013.01); *G05F 1/59* (2013.01); *H02M 1/08* (2013.01); *H02M 2001/0025* (2013.01)

(58) Field of Classification Search
CPC .............. H02M 3/157; H02M 3/158; H02M 2001/0025; H02M 1/08; G05F 1/575; G05F 1/59
See application file for complete search history.

(56) References Cited

U.S. PATENT DOCUMENTS

| | | | |
|---|---|---|---|
| 8,866,462 B2 * | 10/2014 | Luo ........................ | H02M 3/158 323/283 |
| 2007/0182391 A1 | 8/2007 | Chapuis et al. | |
| 2009/0289615 A1 | 11/2009 | Foley | |
| 2010/0156450 A1 | 6/2010 | Inada et al. | |
| 2011/0022867 A1 | 1/2011 | Chang et al. | |
| 2013/0320946 A1 * | 12/2013 | Luo ........................ | H02M 3/158 323/283 |

(Continued)

OTHER PUBLICATIONS

"International Application Serial No. PCT/US2016/048227, International Search Report dated Dec. 13, 2016", 3 pgs.

(Continued)

*Primary Examiner* — Fred E Finch, III
*Assistant Examiner* — Rafael O. De León Domenech
(74) *Attorney, Agent, or Firm* — Schwegman Lundberg & Woessner, P.A.

(57) ABSTRACT

Some embodiments include apparatuses and methods having a power switching unit to receive a first voltage and provide a second voltage having a value based on a value of the first voltage, a first loop to provide digital control information to control a switching of the power switching unit in order to maintain a relationship between the value of the second voltage and a value of a reference voltage, and a second loop coupled to the power switching unit and the first loop to calculate a value of energy consumption of at least a portion of the apparatus based at least on the digital control information.

19 Claims, 6 Drawing Sheets

(56) References Cited

U.S. PATENT DOCUMENTS

| | | | |
|---|---|---|---|
| 2014/0266103 A1* | 9/2014 | Wang | G05F 1/462 |
| | | | 323/274 |
| 2015/0069857 A1* | 3/2015 | Diewald | H01H 47/00 |
| | | | 307/126 |
| 2015/0220138 A1 | 8/2015 | Jones et al. | |
| 2016/0282889 A1* | 9/2016 | Mahajan | G05F 1/575 |

OTHER PUBLICATIONS

"International Application Serial No. PCT/US2016/048227, Written Opinion dated Dec. 13, 2016", 10 pgs.

Ramadass, Yogesh K., et al., "Minimum Energy Tracking Loop With Embedded DC-DC Converter Enabling Ultra-Low-Voltage Operation Down to 250 mV in 65 nm CMOS", IEEE Journal of Solid-State Circuits, vol. 43, No. 1,, (Jan. 2008), 256-265.

Sinangil, Yildiz, et al., "An Embedded Energy Monitoring Circuit for a 128kbit SRAM with Body-biased Sense-Amplifiers", IEEE Asian Solid-State Circuits Conference Nov. 12-14, 2012/Kobe, Japan, (2012), 69-72.

\* cited by examiner

430

| EVALUATION PERIOD | AVERAGE ENERGY PER OPERATION Eop | ADJ$_{VREF}$ | V$_{REF}$ (VOLT) | MEMORY | |
|---|---|---|---|---|---|
| 1 | Eop1(0.50V)=20uJ | DOWN | 0.50 → 0.45 | | |
| 2 | Eop2(0.45V)=15uJ | DOWN | 0.45 → 0.40 | | |
| 3 | Eop3(0.40V)=12uJ | DOWN | 0.40 → 0.35 | | |
| 4 | Eop4(0.35V)=13uJ | UP | 0.35 → 0.40 | 12uJ | —541 |
| 5 | Eop5(0.40V)=11.8uJ | HOLD | 0.40 | 12uJ | |
| 6 | Eop6(0.40V)=12.4uJ | HOLD | 0.40 | 12uJ | |
| 7 | Eop7(0.40V)=12.6uJ | HOLD | 0.40 | 12uJ | |
| 8 | Eop8(0.40V)=12.8uJ | HOLD | 0.40 | 12uJ | |
| 9 | Eop9(0.40V)=12.6uJ | HOLD | 0.40 | 12uJ | |
| 10 | Eop10(0.40V)=12.2uJ | HOLD | 0.40 | 12uJ | |
| 11 | Eop11(0.40V)=13uJ | HOLD | 0.40 | 12uJ | |
| 12 | Eop12(0.40V)=17.6uJ | DOWN | 0.40 → 0.35 | 12uJ | |
| 13 | Eop13(0.35V)=15.2uJ | DOWN | 0.35 → 0.30 | 12uJ | |
| 14 | Eop14(0.30V)=16uJ | UP | 0.30 → 0.35 | 15.2uJ | —542 |
| 15 | Eop15(0.35V)=15uJ | HOLD | 0.35 | 15.2uJ | |
| 16 | Eop16(0.35V)=15.8uJ | HOLD | 0.35 | 15.2uJ | |
| 17 | Eop17(0.35V)=14.6uJ | HOLD | 0.35 | 15.2uJ | |

DIGITAL LOW DROP-OUT VOLTAGE CONTROLLER INCLUDING EMBEDDED DUAL-LOOP FEEDBACK FOR MINIMUM ENERGY POINT OPERATION

TECHNICAL FIELD

Embodiments described herein pertain to power management in electronic systems. Some embodiments relate to voltage controllers.

BACKGROUND

Many electronic devices or systems, such as computers, tablets, and cellular phones, have a power management unit to control power supply voltage for some circuits (e.g., digital circuits) in the device or system. Conventional techniques are available to enable such circuits to operate at a minimum energy point (MEP). The MEP is the power supply voltage at which the circuit may consume the lowest energy per operation. However, as described in more detail below, some conventional techniques may have drawbacks that may make them unsuitable for some applications.

DETAILED DESCRIPTION

Figure 1:
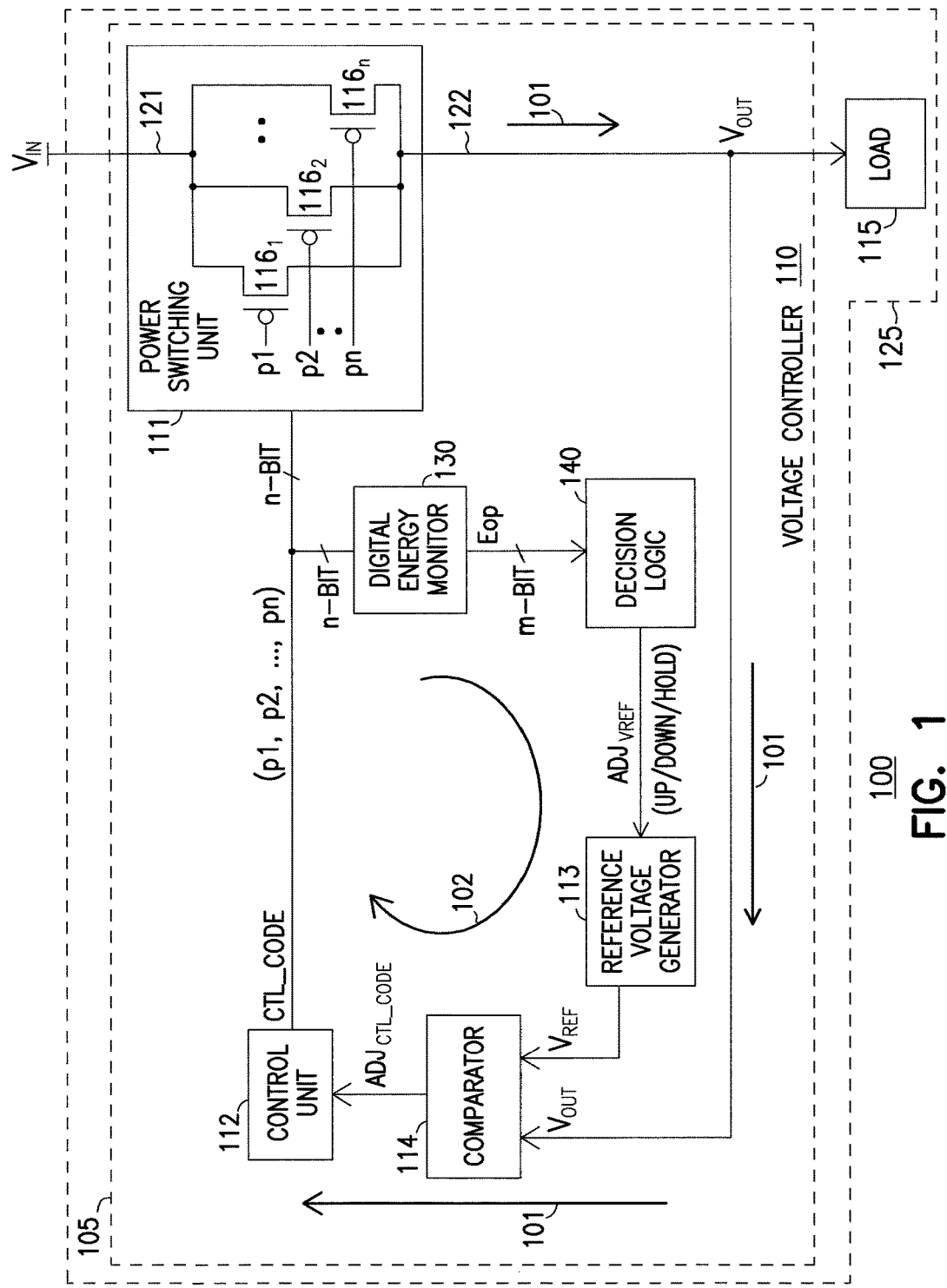
FIG. 1 shows an apparatus including a voltage controller and a load, according to some embodiments described herein.

As an operating voltage (e.g., supply voltage) of digital circuits scales down below a threshold voltage (Vth), the leakage energy consumed per operation in such digital circuit may start to increase exponentially while the active energy may decease quadratically. Hence, the total energy consumption may be minimized at a certain voltage value where the leakage energy becomes comparable to the active energy. Such a voltage value may correspond to the lowest point (e.g. a minimum energy point) on a curve that represents a relationship between operating voltage and energy consumption. Operating at the MEP in a particular digital circuit makes that particular digital circuit more energy efficient. The MEP varies depending on operating conditions such as workload, temperature, and Vth variations. For example, a workload with higher switching activities may lead to a lower MEP, because higher switching activities may dissipate more active energy without adding to any leakage energy.

Conventional techniques for finding the MEP at a given operating condition are proposed. However, some conventional techniques may have drawbacks. For example, some conventional techniques for finding MEP may use analog circuit components such as a time based analog-to-digital converter (ADC), a low-offset comparator, or other analog circuitry. Some of these techniques measure a small difference ($\Delta V$) in values of an output voltage used in calculation for finding energy consumption per operation of a particular digital circuit. However, analog circuits used in these techniques may not be synthesizable. Therefore custom design efforts may be needed.

In another example, some conventional techniques may use a sizable off-chip capacitor to minimize the voltage difference ($\Delta V$), because significant voltage drop may incur functionality issues at near-threshold voltage operation. Such an off-chip capacitor may result in board-level area and cost overheads.

Some conventional techniques for finding MEP may track the MEP of a load circuit only. That means that they may not consider the energy overhead of voltage controllers used for dynamic MEP operation. Thus, if the energy loss of voltage controllers is not negligible, the MEP of an entire system (e.g., a load circuit and a voltage controller) may be different from the tracked MEP of only a load circuit. This may result in inefficient MEP tracking.

Other conventional techniques for finding MEP may not provide in-situ (e.g., embedded) MEP tracking capability. That means that they may not dynamically track the MEP without knowledge of workload characteristics. Even if dynamic MEP tracking can be performed in conventional techniques, such techniques my need advanced knowledge of all possible workload conditions. Therefore sizable lookup tables may be needed. In some situations, software-level support may reduce such sizable lookup tables. However, a software solution may be inapplicable for dynamic MEP tracking in some devices or systems because such a solution may cause operational delay (e.g., delay in a path from hardware to software and then back to hardware).

The following description describes an apparatus (e.g., device or system) including a digital voltage controller to provide a supply voltage to a load. The voltage controller can include components (e.g., digital circuitry and logic) to perform improved techniques for tracking and finding the MEP in not only the load, but also the voltage controller.

The improved techniques for tracking and finding the MEP described herein may be fully synthesizable, may enable dynamic MEP tracking without advanced knowledge of workload characteristics of the load, may track the MEP of an entire apparatus or system (e.g., the MEP of the voltage controller and the load). The techniques described herein include components that can be embedded in the voltage controller (e.g., in a digital low drop-out (LDO) regulator). The techniques described herein may avoid an off-chip capacitor, thereby hardware overheads (e.g., power and circuit board area overheads) may be relatively smaller.

FIG. 1 shows an apparatus 100 including a voltage controller 110 and a load 115, according to some embodiments described herein. Apparatus 100 can include or be included in an electronic device or system, such as a computer (e.g., desktop, laptop, or notebook), a tablet, a cellular phone, wearable electronics (e.g., smart watches), or other electronic devices or systems. As described in more detail below, voltage controller 110 can include components (e.g., digital circuitry and logic) to perform improved techniques for tracking and finding the MEP in the entire arrangement 125, which includes not only load 115, but also voltage controller 110.

As shown in FIG. 1, voltage controller 110 can receive a voltage (e.g., input voltage) $V_{IN}$ at a node (e.g., supply node) 121 and provide a voltage (e.g., output voltage or load voltage) $V_{OUT}$ at a node (e.g., output node) 122. The value of voltage $V_{OUT}$ can be less than the value of voltage $V_{IN}$ by a relatively small amount (e.g., a low drop-out from voltage $V_{IN}$ to voltage $V_{OUT}$) or a relatively large amount depending on the load operating conditions. Voltage controller 110 includes digital components (described below) to control (e.g., regulate) the value of voltage $V_{OUT}$, such that voltage controller 110 can be referred to as (e.g. or can operate) as digital LDO voltage controller (or regulator). In some arrangements (e.g., configurations) of voltage controller 110, voltages $V_{IN}$ and $V_{OUT}$ at node 121 may each have a value of less than 1V (e.g., $V_{IN}$=0.6V and $V_{OUT}$<0.60V (e.g., between 0.35V and 0.50). The value of 1V is used as an example. Voltages $V_{IN}$ and $V_{OUT}$ may have different values.

Load 115 may use voltage $V_{OUT}$ as its operating voltage (e.g., regulated supply voltage). Load 115 can include or be included in a functional unit such as a processor (e.g., a central processing unit (CPU)), a memory device, or other functional (e.g., digital circuits) units.

As shown in FIG. 1, apparatus 100 can include an integrated circuit (IC) die 105 (e.g., an IC chip). The IC die 105 can include a semiconductor die (e.g., a silicon die). Voltage controller 110 can be included in (e.g., integrated in, located on or in, formed in, or formed on) die 105. Load 115 can be included in another IC die separated from IC die 105. For example, voltage controller 110 can be included in one IC die on a circuit board (e.g., motherboard), not shown in FIG. 1, and load 115 can be included in another IC die on the circuit board and coupled to voltage controller 110 through conductive traces (e.g., copper trances) on the circuit board.

FIG. 1 shows an example where load 115 is located outside IC die 105. However, voltage controller 110 and load 115 and can be included in the same IC die.

Apparatus 100 can include or be included in a system on chip (SoC), such that voltage controller 110 and load 115 can be included (e.g., integrated) in the SoC.

As shown in FIG. 1, voltage controller 110 can include a power switching unit 111, a control unit 112, a reference voltage generator 113, and a comparator 114. Power switching unit 111 can operate to receive voltage $V_{IN}$ provide voltage $V_{OUT}$. Control unit 112 can operate to generate control information (digital information) CTL_CODE to control (e.g., digitally control) switching of power switching unit 111. Reference voltage generator 113 can operate to generate a voltage (e.g., reference voltage) $V_{REF}$. Comparator 114 can operate to compare voltage $V_{OUT}$ with a voltage (e.g., reference voltage) $V_{REF}$ and generate information (e.g., command) $ADJ_{CTL\_CODE}$. Based on information $ADJ_{CTL\_CODE}$, control unit 112 can control (e.g., increase, decrease, or keep the same) the value of control information CTL_CODE.

As shown in FIG. 1, voltage controller 110 can include a loop (e.g., a circuit feedback loop) 101 that can include at least control unit 112 and comparator 114. Loop 101 can operate to maintain the value of voltage $V_{OUT}$ at approximately the value of a target voltage (e.g., $V_{REF}$) in order to regulate the value of the load voltage (e.g., voltage $V_{OUT}$) at node 122. In operation, comparator 114 of loop 101 can provide information $ADJ_{CTL\_CODE}$ based on a comparison (e.g., a difference) between the values of voltages $V_{OUT}$ and $V_{REF}$. Control unit 112 can control (e.g., increase, decrease, or keep the same) the value of control information CTL_CODE based on the value of information $ADJ_{CTL\_CODE}$ provided by comparator 114. The operations of control unit 112 and comparator 114 allow loop 101 to maintain the value of voltage $V_{OUT}$ at approximately the value of voltage $V_{REF}$.

Power switching unit 111 can include transistors (e.g., power transistors) $116_1$ through $116_n$ arranged (e.g., in parallel) between nodes 121 and 122. Control unit 112 can include a counter (e.g., n-bit up/down counter) to generate control information CTL_CODE having a number of bits (e.g., n bits), such as bits p1 through pn. Each bit among the bits of control information CTL_CODE may be used to control a gate of a respective transistor among transistors $116_1$ through $116_n$. Reference voltage generator 113 can include a band-gap based reference voltage generator to generate voltage $V_{REF}$. Comparator 114 can include a single bit comparator or alternatively a multi-bit analog-to-digital converter (ADC) comparator.

Voltage controller 110 can include a loop (e.g., a circuit feedback loop) 102 to determine the MEP in voltage controller 110 and load 115 at different times. As shown in FIG. 1, a loop 102 can include a digital energy monitor 130 and a decision logic 140. Digital energy monitor 130 can include digital circuitry that can operate to perform operations (e.g., mathematic operations) to calculate (e.g., evaluate) energy consumption of at least a portion of apparatus 100 (e.g., the portion including arrangement 125 that includes voltage controller 110 and load 115). The calculation of the energy consumption can include a calculation of average energy per operation Eop of voltage controller 110 and load 115.

Decision logic 140 can include hardware (e.g., circuitry), software, or a combination of hardware and software to perform local minima searching in order to track and find the MEP of voltage controller 110 and load 115. For example, based on the energy consumption calculated by digital energy monitor 130, decision logic 140 can operate to adjust (e.g., dynamically adjust) the value of voltage $V_{REF}$ in order to track and find the MEP of voltage controller 110 and load 115. A detailed description of loop 102 (e.g., digital energy monitor 130 and a decision logic 140) is below (FIG. 3, FIG. 4, and FIG. 5) after the description of FIG. 2.

Figure 2:
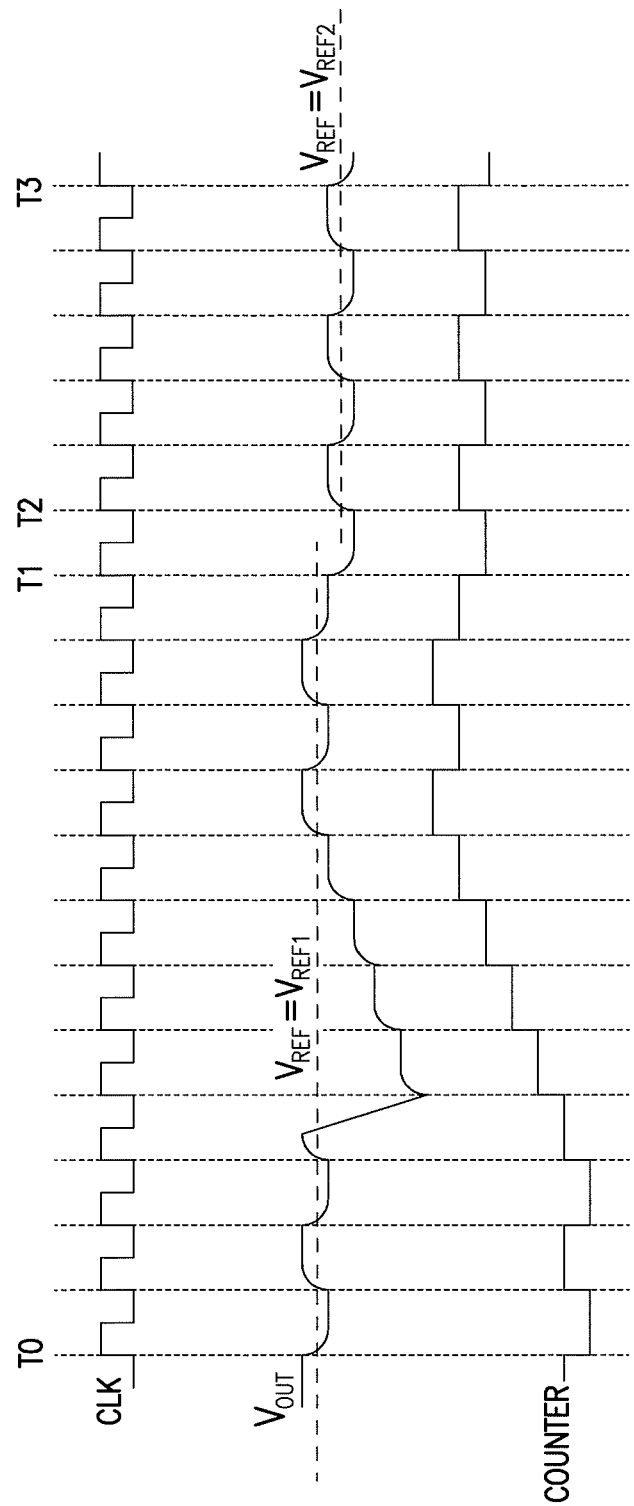
FIG. 2 shows example waveforms for the voltage controller of FIG. 1, according to some embodiments described herein.

FIG. 2 shows example waveforms for voltage controller 110 of FIG. 1, according to some embodiments described herein. In FIG. 2, voltages $V_{REF1}$ and $V_{REF2}$ represent voltage $V_{REF}$ (FIG. 1) generated by reference voltage generator 113 at different times. For example, between times T0 and T1, reference voltage generator 113 (FIG. 1) may generate voltage $V_{REF}$ (represented by $V_{REF1}$ in FIG. 2) having a value of 0.40V and hold it at 0.40V. Between times T2 and T3, reference voltage generator 113 may generate voltage $V_{REF}$ (represented by $V_{REF1}$ in FIG. 2) having another value (e.g., new value) of 0.35V and hold it at 0.35V.

Between times T0 and T1, the value of voltage $V_{OUT}$ may be maintained by loop 101 (FIG. 1), such that the value of voltage $V_{OUT}$ can be approximately equal to the value of voltage $V_{REF}$ (e.g., at $V_{REF1}$=0.40V) in order to regulate the value of the load voltage (e.g., voltage $V_{OUT}$) at node 122 (FIG. 1).

Between times T1 and T2, the value of $V_{REF1}$ changes to the value of $V_{REF2}$. This indicates that loop 102 (FIG. 1) of voltage controller 110 may cause reference voltage generator 113 to generate a new value (e.g., 0.35V) as part of an operation to track the MEP of voltage controller 110 and load 115.

Between times T2 and T3, loop 101 operates in a similar way as between times T0 and T1. For example, as shown in FIG. 2, between times T2 and T3, the value of voltage $V_{OUT}$ may be maintained by loop 101 (FIG. 1), such that the value of voltage $V_{OUT}$ can be approximately equal to the value of voltage $V_{REF}$ (e.g., at $V_{REF}2$=0.35V) in order to regulate the value of the load voltage (e.g., voltage $V_{OUT}$) at node 122 (FIG. 1).

The example of FIG. 2 shows waveforms associated with only a portion of the operations of voltage controller 110 of FIG. 1, where reference voltage generator 113 generates voltage $V_{REF}$ having two different values (e.g., 0.40V and 0.35V) at different times. However, reference voltage generator 113 can generate voltage $V_{REF}$ having more than two different values between times T0 and T3, depending on the number of MEPs found by voltage controller 110 between times T0 and T3.

After time T3, the waveform for the rest of the operations of voltage controller 110 may follow a similar pattern between times T0 and T3. For example, after time T3, if loop 102 (FIG. 1) finds a new MEP at a particular value of $V_{REF}$ (e.g., a value different from $V_{REF2}$=0.35V or 0.40V), then loop 102 may cause reference voltage generator 113 to generate voltage $V_{REF}$ with that particular value.

The clock signal CLK in FIG. 2 is a timing signal that may be used by a counter in control unit 112 to adjust (e.g., increase (e.g., count up) or decrease (e.g., countdown)) the value of control information CTL_CODE. This allows control unit 112 to control power switching unit 111 (e.g., change the number of transistors $116_1$ through $116_n$ that are turned on) in order to maintain the value of voltage $V_{OUT}$ to be approximately equal to the value of voltage $V_{REF}$ (e.g., $V_{REF1}$ or $V_{REF2}$ in FIG. 2).

In the example of FIG. 2, the value of voltage $V_{REF}$ held at $V_{REF1}$ (e.g., 0.40V) between times T0 and T1 and at $V_{REF2}$ (e.g., 0.35V) between times T2 and T3 may indicate that two MEPs (associated $V_{REF1}$ and $V_{REF2}$) may have been found by loop 102. For example, before time T0, loop 102 may find the MEP when $V_{REF}$=$V_{REF1}$. In another example, between times T1 and T2, loop 102 may find the MEP when $V_{REF}$=$V_{REF2}$.

Tracking of the MEP by voltage controller 110 can include calculating (e.g., performed by digital energy monitor 130 of FIG. 1) and then comparing (e.g., performed by decision logic 140 of FIG. 1) an average energy per operation Eop of voltage controller 110 and load 115 in an energy evaluation (e.g., calculation) period with one or more average energy per operation Eop of voltage controller 110 and load 115 in other evaluation periods.

Figure 3:
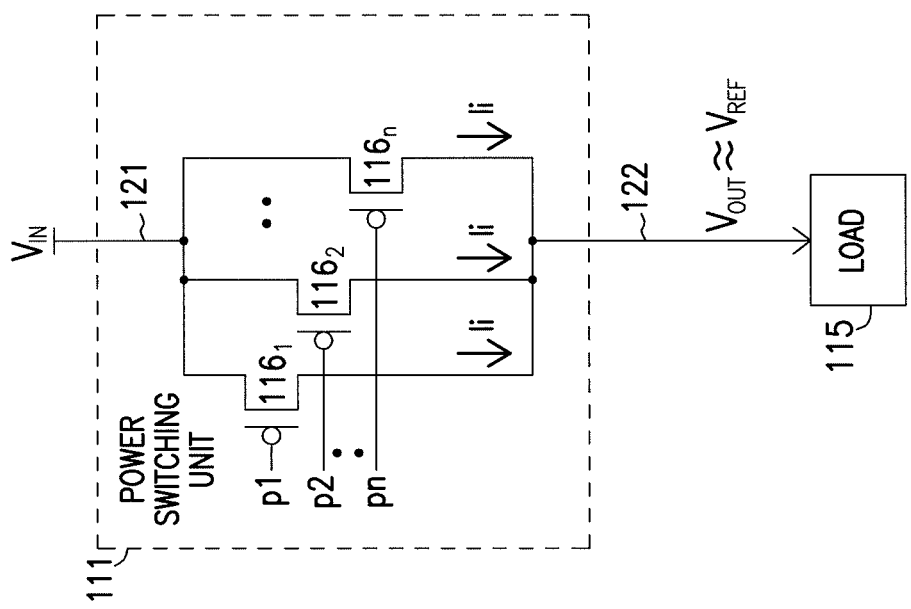
FIG. 3 shows a power switching unit of the voltage controller FIG. 1, the load of FIG. 1, and some values used in calculating average energy per operation, according to some embodiments described herein.

FIG. 3 shows power switching unit 111 and load 115 of FIG. 1 and some values used in calculating average energy per operation Eop, according to some embodiments described herein. In FIG. 3, each of transistors $116_1$ through $116_n$ can include a power transistor, such as a p-channel transistor (e.g., p-channel metal oxide semiconductor (PMOS) power transistor). Current $I_i$ indicates a current flowing through a particular transistor among transistors $116_1$ through $116_n$ in a particular cycle (e.g., cycle "i" of a clock signal) if that particular transistor is turned on during that cycle. Current $I_i$ may not flow through a particular transistor among transistors $116_1$ through $116_n$ if that particular transistor is turned off.

In a particular cycle, some of transistors $116_1$ through $116_n$ may be turned on while the rest of transistors $116_1$ through $116_n$ may be turned off, depending on the energy consumed by voltage controller 110 and load 115 at that particular cycle. The number transistors among transistors $116_1$ through $116_n$ that are turned on may be different from one cycle to the next cycle, depending on energy consumed by voltage controller 110 and load 115.

Each of transistors $116_1$ through $116_n$ may be turned on or turned off based on the value of a corresponding bit (e.g., one of p1 through pn) of control information CTL_CODE. The number of bits (e.g., n bits) of control information CTL_CODE can be equal to the number (e.g., n) of transistors $116_1$ through $116_n$. For example, if the number of transistors $116_1$ through $116_n$ is 16 (e.g., n=16), then control information CTL_CODE can have 16 bits to control the corresponding gates of 16 transistors $116_1$ through $116_n$ (in order to turn on or turn off the transistors).

Since transistors $116_1$ through $116_n$ are PMOS transistors, a particular transistor among transistors $116_1$ through $116_n$ can be turned on if the bit controlling its gate has a value of binary zero ("0") and turned off if the bit has value of binary one ("1"). As an example, during a particular cycle, if the values (binary values) of p1, p2, . . . , pn are "11, . . . , 0", then transistors $116_1$ and $116_2$ are turned off and transistor $116_n$ is turned on during that particular cycle.

Calculation (e.g., evaluation) of energy consumed by voltage controller 110 and load 115 can be based at least in part on the switching (e.g., turning on and turning off) of transistor $116_1$ and $116_n$. In the calculation of energy described below, the size of transistors $116_1$ through $116_n$ is assumed to be the same (e.g., same weight). However, in some cases, transistors $116_1$ through $116_n$ can have different sizes (e.g., different weights, such as binary weighed transistors). In such cases, the calculation of energy associated with formula (1) below may be modified accordingly without departing from the scope of the subject matter described herein.

The description associated with FIG. 3 describes calculation of an average energy per operation Eop consumed by voltage controller 110 and load 115 (FIG. 1) during N cycles (e.g., N cycles of clock signal CLK). The energy per operation of voltage controller 110 and load 115 can include the energy consumed by voltage controller 110 and load 115 in one cycle of a clock signal (e.g., CLK in FIG. 2). Thus, average energy per operation Eop of voltage controller 110 and load 115 can include an energy per cycle consumed by voltage controller 110 and load 115. The value (e.g., in Joule unit) of the average energy per operation Eop can be represented by digital information (e.g., digital code) that includes a number of bits (e.g., m bits as shown in FIG. 1).

In order to find the MEP of voltage controller 110 and load 115 (FIG. 1), digital energy monitor 130 may calculate many average energy per operations (many Eops) for many different N cycles. For example, if N is set at 1000, then digital energy monitor 130 may calculate Eop1 (one average energy per operation) during 1000 cycles, calculate Eop2 (another average energy per operation) during another 1000 cycles, calculate Eop3 (another average energy per operation) during another 1000 cycles, and so on. Decision logic 140 can operate (as described in detail with reference to FIG. 5) to find the MEP of voltage controller 110 and load 115 based on the different average energy per operations (e.g., Eop1, Eop2, and Eop3, and so on) calculated by digital energy monitor 130.

In FIG. 3, the average energy per operation (e.g., one of Eop1, Eop2, and Eop3 in the above example) for particular N cycles is calculated (e.g., digitally calculated) as follows:

$$Eop_j = \frac{1}{N} \sum_{i=0}^{N-1} p(i) \times I_i \times V_{IN} + \frac{1}{N} \sum_{i=0}^{N-1} p(i) \times \frac{(V_{IN} - V_{OUT})}{R_{ON,PMOS}} \times V_{IN} \quad (1)$$

$$\cong \frac{(V_{OUT} - V_{IN})}{N \times R_{ON,PMOS}} \times \sum_{i=0}^{N-1} p(i)$$

In formula (1) the average energy per operation $Eop_j$ is the average energy per operation consumed by voltage controller 110 and load 115 during an evaluation period (e.g., evaluation period j). Each evaluation period is N cycles. For example, if N=1000 cycles and the total energy consumed by voltage controller 110 and load 115 during N=1000 cycles is 14,000 uJ (micro-Joule), then the average energy per operation (e.g., per cycle) during this 1000 cycles in this example is 14,000 uJ/1000=14 uJ. Thus, the energy per operation $Eop_j$ is equal to the total energy of N cycles calculated during an evaluation period (e.g., during N=1000 cycles) divided by the number of cycles (e.g., divided by 1000) used to calculate the total energy calculated in the evaluation period.

In the formula (1), p(i) is a vector having components represented by bits p1 through pn (e.g., vector pi= [p1, p1, . . . , pn]. In a particular cycle (e.g., cycle i) the value of vector p(i) can be based on the values of the number of bits (among bits of control information CTL_CODE of FIG. 1) that cause a corresponding transistor among transistors $116_1$ through $116_n$ to turn on. As described above, each of transistors $116_1$ through $116_n$ is a PMOS transistor that can be turned on by a corresponding bit (e.g., one of bits p1 through pn) that has a value of "0" (binary zero). Thus, the value of vector p(i) can be obtained by counting the number of bits (among the bits of control information CTL_CODE) that have "0" values. For example, if control information CTL_CODE has 16 bits and the values (binary values) of the 16 bits are "1111111111000000", then the value of vector p(i) in this example is six (the number of "0"s in "1111111111000000").

The value of N in formula (1) is the number of cycles (e.g., cycles of clock signal CLK) used for each energy evaluation period. The value of N can be programmable. The value of N is a digital value that can be set at a value that may depend on workload length, scale, or both, of load 115. For example, as described above, the value of N can be set at 1000 (or at another number).

Voltage $V_{IN}$ can be the supply voltage of voltage controller 110. Thus, the value of voltage $V_{IN}$ is a known value. The value of voltage $V_{IN}$ can be a digital value (e.g., digital code) that can be determined by overall system requirements (dynamic voltage and frequency scaling (DVFS)) of the system that includes voltage controller 110.

As shown in FIG. 3, voltage $V_{OUT}$ at node 122 can be assumed to be approximately equal to the value of voltage $V_{REF}$ for a large number of N. Thus, in formula (1) above, voltage $V_{OUT}$ can be substituted by voltage $V_{REF}$.

Voltage $V_{REF}$ is the voltage generated by reference voltage generator 113 (FIG. 1). Different evaluation periods may have different values of $V_{REF}$. For example, in one energy evaluation period (e.g., during N=1000 cycles), voltage $V_{REF}$ may have a value of 0.45V. During another evaluation period (e.g., another N=1000 cycles), voltage $V_{REF}$ may have a value of 0.40V. The value of voltage $V_{REF}$ can be a digital value (e.g., digital code) given by a minimum steps of voltage controller 110 (e.g., a minimum LDO step of 50 mV). Different values of $V_{REF}$ have different digital codes.

The value of resistance $R_{ON,PMOS}$ (on-resistance) is based on the resistance of a PMOS transistor (e.g., transistors $116_1$ through $116_n$) when it is turned on. The size of each of transistors $116_1$ through $116_n$ can be relatively large in order to provide enough current for load 115 (FIG. 1). Thus, the value of $R_{ON,PMOS}$ of transistors $116_1$ through $116_n$ may hardly be influenced by process variation. Therefore, the value of $R_{ON,PMOS}$ of transistors $116_1$ through $116_n$ can be a digital value and can be determined at design phase (this means that any post-silicon tuning processes may be omitted). However, in voltage controller 110, the value of resistance $R_{ON,RMOS}$ of each of transistors $116_1$ through $116_n$ may be dependent on its drain voltage (e.g., voltage $V_{REF}$ at node 122). The values of $R_{ON,PMOS}$ of transistors $116_1$ through $116_n$ can have multiple digital codes mapping to respective values of voltage $V_{REF}$.

The value of summation $$\sum_{i=0}^{N-1} p(i)$$

can be based on the values of the number of bits (among bits of control information CTL_CODE of FIG. 1) that cause a corresponding transistor among transistors $116_1$ through $116_n$ to turn on during N cycles. Thus, the value of this summation can be obtained by counting the number of bits (among the bits of control information CTL_CODE) that have "0" values during N cycle.

As described above, during a particular cycle i, some of transistors $116_1$ through $116_n$ may be turned on and some may be turned off. For energy evaluation, some values of p(i) in $$\sum_{i=0}^{N-1} p(i)$$

may be omitted from the calculation of this summation. For example, digital energy monitor 130 of FIG. 1 may not need to check (e.g., monitor) all values of p(i). Instead, digital energy monitor 130 may check only the bits of control information CTL_CODE that have "0" values and ignore bits having "1" values. Checking bits having "0" value may be achieved by using a counter (e.g., a simple up counter to count the number of "0" in the bits of control information CTL_CODE). For example, in a particular cycle i, if the number of transistors $116_1$ through $116_n$ is 16 (e.g., n=16), and 16 bits of control information CTL_CODE (controlling the 16 transistors) include 6 bits having value "0" and 11 bits having value "1", then the value of p(i) to be checked (e.g., counted) in that particular is six. Digital energy monitor 130 can use a counter to add the number of "0" from each cycle of the N cycles to provide the value for $$\sum_{i=0}^{N-1} p(i).$$

Thus, as described above, all of the terms N, $V_{IN}$, $V_{REF}$, $R_{ON,PMOS}$, and $\Sigma p(i)$ in formula (1) can have digital values (e.g., digital codes). Therefore, energy evaluation to determine the value of average energy per operation Eop of voltage controller 110 and load 115 can be digitally implemented. For example, based on formula (1), simple digital circuitry can be used, such as a counter for $\Sigma p(i)$ calculation, dedicated computation unit for one subtraction, three multiplications, and one division. In comparison with some conventional energy calculation techniques, the digital implementation may allow the circuit arrangement of voltage controller 110 to be less complicated, more accurate, easier to synthesize, or all of these improvements. Since loop 102 is embedded in (e.g., in situ) voltage controller 110, loop 102 may perform the calculation of energy consumption of voltage controller 110 and load 115 without using a capacitor coupled to load 115 (e.g., without using an off-chip capacitor coupled to node 122 of FIG. 1). Further, since loop 102 is embedded in voltage controller 110, load 115 can remain coupled to node 122 during the calculation of energy consumption in voltage controller 110 and load 115.

Figure 4:
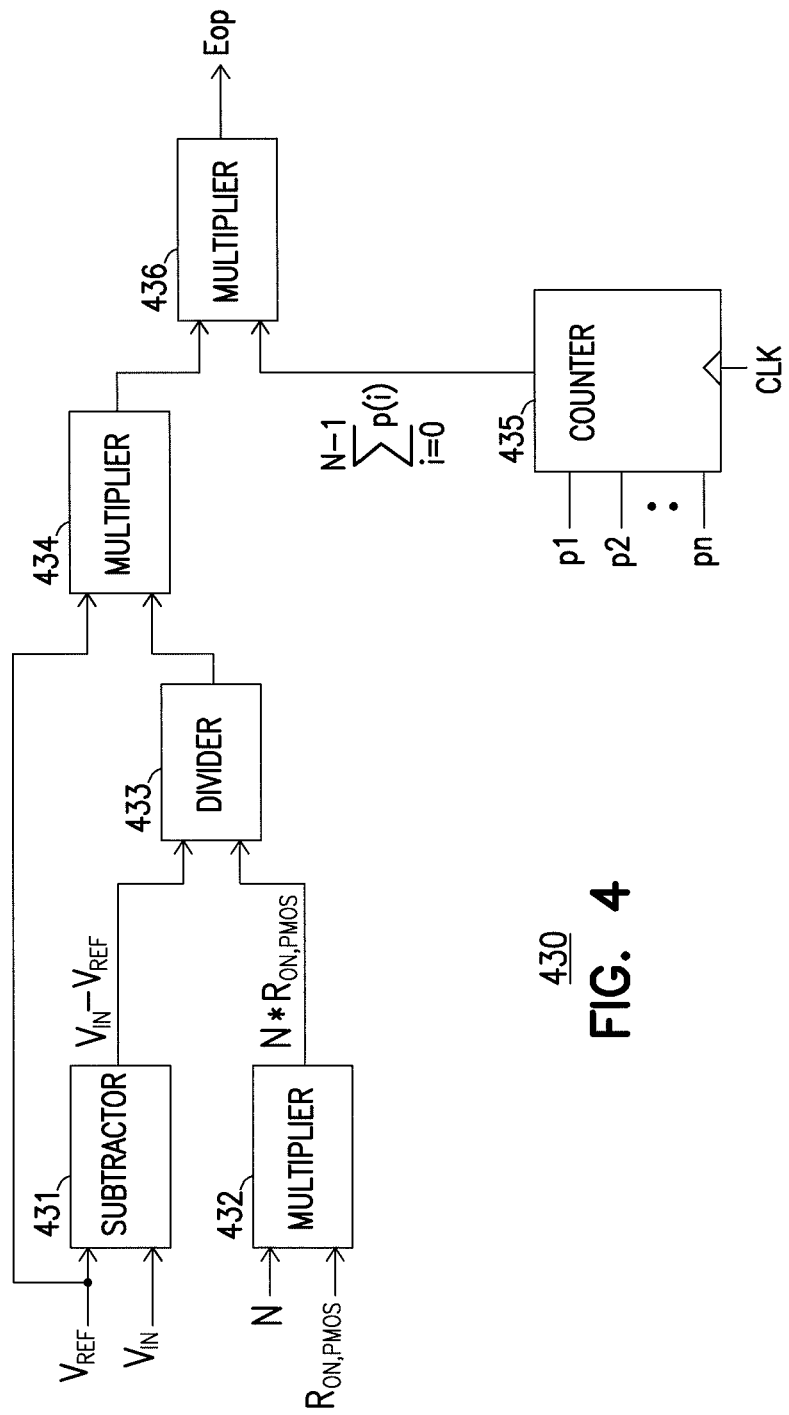
FIG. 4 is a block diagram showing a digital energy monitor, according to some embodiments described herein.

FIG. 4 is a block diagram showing a digital energy monitor 430, according to some embodiments described herein. Digital energy monitor 430 can be used as digital energy monitor 130 of FIG. 1. Digital energy monitor 430 of FIG. 4 can operate to evaluate energy per operation Eop described above with reference to FIG. 3.

As shown in FIG. 4, digital energy monitor 430 can include inputs (e.g., input nodes) to receive the digital values (e.g., digital codes) of $V_{REF}$, $V_{IN}$, N, $R_{ON,PMOS}$, and digital value (e.g., "0" or "1") of the components (e.g., p1 through pn) of vector p(i). Based on formula (1), digital energy monitor 430 can perform math operations on these digital values and provide average energy per operation Eop (represented by Eopj in formula (1)) at the output (e.g., output node or nodes) of digital energy monitor 430.

As shown in FIG. 4, digital energy monitor 430 can include a subtractor (e.g., circuit) 431 to perform a subtraction operation $V_{IN}-V_{REF}$, a multiplier (e.g., circuit) 432 to perform a multiplication operation $N \times R_{ON,PMOS}$, a divider (e.g., circuit) 433 to perform a division operation $(V_{IN}-V_{REF})/(N \times R_{ON,PMOS})$, and a multiplier (e.g., circuit) 434 to perform a multiplication operation $V_{REF} \times [(V_{IN}-V_{REF})/(N \times R_{ON,PMOS})]$.

As shown in FIG. 4, digital energy monitor 430 can also include a counter 435 and a multiplier (e.g., circuit) 436. Counter 435 can operate to count the number of bits among bits p1 through pn that have a value of "0". Counter 435 may perform the count operation based on timing (e.g., based on the cycles of a clock cycle CLK. Multiplier (e.g., circuit) 436 can perform a multiplication operation on a digital value $\{V_{REF} \times [(V_{IN}-V_{REF})/(N \times R_{ON,PMOS})]\}$ from outputs of counter 435 and multiplier 436.

The value of energy per operation Eop calculated from one evaluation period may be different from the value of energy per operation Eop calculated from another evaluation period. Based on the value of energy per operation Eop from each of the evaluation periods calculated by digital energy monitor 430, decision logic 140 can operate to find the MEP of voltage controller 110 and load 115.

Figure 5:
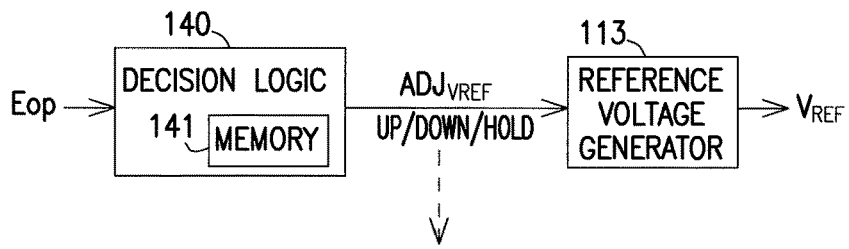
FIG. 5 shows a decision logic and a reference voltage generator of the voltage controller of FIG. 1, and an example of finding the MEP in the voltage controller and the load of FIG. 1, according to some embodiments described herein.

FIG. 5 shows decision logic 140 and reference voltage generator 113 of FIG. 1 and an example of finding the MEP in voltage controller 110 and load 115, according to some embodiments described herein. FIG. 5 shows an example of 17 evaluation periods 1 through 17 and corresponding 17 average energy per operations Eop1 through Eop17 calculated by digital energy monitor 130. Decision logic 140 can use average energy per operations Eop1 through Eop17 to find the MEPs in voltage controller 110 and load 115.

Each of evaluation periods 1 through 17 can be N cycles (e.g., N=1000 cycles), as described above. Digital energy monitor 130 (FIG. 1) may sequentially perform evaluation periods 1 through 17 to calculate average energy per operations Eop1 through Eop17, respectively.

The value of each of average energy per operation Eop1 through Eop17 is measured in Joule units, such as in micro-Joule (uJ) units, in the example of FIG. 5. The values (in uJ) of average energy per operations Eop1 through Eop17 may be the same or different, depending on operating conditions of voltage generator 110 and load 115. The value (in volts) of voltage $V_{REF}$ used for calculation of average energy per operations Eop1 through Eop17 from one evaluation period to the next may be the same or different.

The values in FIG. 5 are described as follows. For example, evaluation period 1, Eop1=Eop (0.50V)=20 uJ/cycle, indicates that the average energy per operation (Eop1) during evaluation period 1 (during N cycles) is 20 uJ, which is calculated by digital energy monitor 130 at the value of $V_{REF}=0.50V$. In another example, evaluation period 2, Eop2=Eop (0.45V)=15 uJ/cycle, indicates that the average energy per operation (Eop2) during evaluation period 2 (during N cycles) is 15 uJ, which is calculated by digital energy monitor 130 using the value of $V_{REF}=0.45V$.

The UP/DOWN/HOLD directions represent the directions that decision logic 140 used to control (e.g., increase, decrease, or keep the same) the value of information $ADJ_{REF}$. Based on the UP/DOWN/HOLD directions, reference voltage generator 113 can control (e.g., increase, decrease, or keep the same) the value of voltage $V_{REF}$ accordingly. For example, the UP and DOWN directions can cause reference voltage generator 113 to increase and decrease, respectively, the value of $V_{REF}$. The HOLD direction can cause reference voltage generator 113 to keep the value of $V_{REF}$ at the same value. In the example of FIG. 5, the value of $V_{REF}$ can be adjusted (e.g., increased or decreased) by 50 mV (millivolts) at a time (e.g., a minimum LDO step of 50 mV). However, the same value of voltage $V_{REF}$ may result in different values (in micro-Joule) of average energy per operation calculated by digital energy monitor 130, depending on the operating conditions of voltage generator 110 and load 115 at the time a particular average energy per operation is calculated.

In the example associated with FIG. 5, decision logic 140 is assumed to be configured such that at the start of the operation of finding MEP (before an initial MEP associated with a local minima is found), if an initial value of voltage $V_{REF}$ is greater than the value of the threshold voltage (e.g., Vth of transistors $116_1$ through $116_n$), then decision logic 140 can adjust (e.g., change) the value of information $ADJ_{VREF}$ in the DOWN direction at the start of finding the initial MEP. In FIG. 5, reference voltage generator 113 is assumed to be configured to generate voltage $V_{REF}$ having an initial value (e.g., a value before evaluation period 1) greater than the value of Vth. For example, the initial value of $V_{REF}$ may be set to be $V_{REF}$ (initial)=1.2×Vth, where Vth can be between 0.3V and 0.4V. Based on these assumptions, an initial MEP and subsequent MEP (or MEPs) can be determined (e.g., found) by decision logic 140 as follows.

As shown in FIG. 5, in evaluation period 1, the value of average energy per operation (e.g., initial) Eop1 is 20 uJ. Thus, the direction (e.g., initial direction at the start of finding the MEP) for the value of information $ADJ_{VREF}$ associated with Eop1 is the DOWN direction because the value (e.g., initial value) of $V_{REF}$ is 0.50V, which is greater than the value of Vth (e.g., between 0.30V and 0.40V) as assumed above. Therefore, an initial direction (e.g., DOWN) for the value of information $ADJ_{VREF}$ associated with Eop1 may be based on the value of voltage $V_{REF}$ (and not based on the value (20 uJ) of Eop1. However, subsequent directions for the value of information $ADJ_{VREF}$ (e.g., associated with Eop2 through Eop17) can be based on the values (e.g., uJ) of subsequent average energy per operations. In response to the value of information $ADJ_{VREF}$ being adjusted in the DOWN direction based on Eop1 (0.50V)=20 uJ/cycle, reference voltage generator 113 changes the value of $V_{REF}$ in the same direction (DOWN). Thus, as shown in FIG. 5, the value of $V_{REF}$ is changed from 0.50V to 0.45V (e.g., LDO step voltage of 50 mV). The example of FIG. 5 uses 50 mV (LDO step voltage of 50 mV) as an example. Another value for the step voltage may be used.

In evaluation period 2, the value of average energy per operation Eop2 is 15 uJ (Eop2 (0.45V)=15 uJ/cycle). Decision logic 140 compares this value (15 uJ) with the previous value (value of Eop1) and detects a decrease in the value of average energy per operation (e.g., from Eop1=20 uJ to Eop2=15 uJ). The decrease in the average energy per operation may indicate that 15 uJ may be the MEP (e.g., associated with a local minima). However, in order to determine whether 15 uJ can be considered as the MEP (the initial MEP in this example), decision logic 140 adjusts the value of information $ADJ_{VREF}$ in the DOWN direction. Then, decision logic 140 continues to compare the present average energy per operation (e.g., Eop2=15 uJ) with the value of next average energy per operation (e.g., Eop3) in the next evaluation period (e.g., evaluation period 3). In response to the value of information $ADJ_{VREF}$ being adjusted in the DOWN direction based on Eop2 (0.45V)=15 uJ/cycle, reference voltage generator 113 changes the value of $V_{REF}$ in the same direction (DOWN). Thus, as shown in FIG. 5, the value of $V_{REF}$ is changed from 0.45V to 0.40V. This 0.40V value of voltage $V_{REF}$ is used in the calculation of the next average energy per operation (e.g., Eop3).

In evaluation period 3, the value of average energy per operation Eop3 is 12 uJ (Eop3 (0.40V)=12 uJ/cycle). Decision logic 140 compares this value with the previous value (value of Eop2) and detects a decrease in the value of average energy per operation (e.g., from Eop2=15 uJ to Eop3=12 uJ). This decrease in average energy per operation is similar to the previous situation (from Eop1=20 uJ to Eop2=15.0 uJ). The decrease in the average energy per operation may indicate that 12 uJ may be the MEP. However, similarly to the previous situation, in order to determine whether 12 uJ can be considered as the MEP (the initial MEP in this example), decision logic 140 adjusts the value of information $ADJ_{VREF}$ in the DOWN direction. Then, decision logic 140 continues to compare the present average energy per operation (e.g., Eop3=12 uJ) with the value of the next average energy per operation (e.g., Eop4) in the next evaluation period (e.g., evaluation period 4). In response to the value of information $ADJ_{VREF}$ being adjusted in the DOWN direction based on Eop3 (0.45V)=15 uJ/cycle, reference voltage generator 113 changes the value of $V_{REF}$ in the same direction (DOWN). Thus, as shown in FIG. 5, the value of $V_{REF}$ is changed from 0.40V to 0.35V. This 0.35V value of voltage $V_{REF}$ is used in the calculation of the next average energy per operation (e.g., Eop4).

In evaluation period 4, the value of average energy per operation Eop4 is 13 uJ. Decision logic 140 compares this value with the previous value (Eop3=12 uJ) and detects an increase in the value of average energy per operation (e.g., from Eop3=12 uJ to Eop4=13 uJ). This increase in average energy per operation (e.g., from Eop3=12 uJ to Eop4=13 uJ) indicates that the previous value of average energy per operation (Eop3=12 uJ) may be considered as the MEP (an initial MEP in this example). Thus, in response to the increase in the value of average energy per operation, decision logic 140 determines that the MEP (Eop3=12 uJ) is considered to be found.

As shown in FIG. 5, decision logic 140 may perform an operation (e.g., operation 541) to store (e.g., in memory 141) the value (e.g., 12 uJ) of the average energy per operation that is considered as the MEP. FIG. 5 shows memory 141 being inside decision logic 140 as an example. However, memory 141 may be located at another location in voltage controller 110. After the MEP is found, Decision logic 140 also adjusts the value of information $ADJ_{VREF}$ to cause reference voltage generator 113 to change the value of $V_{REF}$ to the value (e.g., 0.40V associated with Eop3) at which the MEP is considered to be found. Thus, in this example, decision logic 140 adjusts the value of information $ADJ_{VREF}$ in the UP direction (as shown in FIG. 5) in order to cause reference voltage generator 113 to change (e.g., increase) the value of voltage $V_{REF}$ from 0.35V to 0.40V (which is the value of voltage $V_{REF}$ associated with the MEP).

Decision logic 140 may hold (e.g., indicate by "HOLD") the value of $ADJ_{VREF}$ in order to cause reference voltage generator 113 to hold the value of voltage (e.g., 0.40V) $V_{REF}$ associated with the MEP after the value in memory 141 is changed to the value associated with the MEP. While the value of $V_{REF}$ is held at the value associated with the MEP, digital energy monitor 130 continues to perform evaluation periods (e.g., 5 through 17) in order to calculate additional Eops (e.g., Eop5 through Eop17), and decision logic 140 continues to find (e.g., search for) a new MEP (e.g., a subsequent MEP after the initial MEP is found). If a new MEP is found (e.g., the MEP associated with Eop13) then decision logic 140 may perform an operation (e.g., operation 542) to update the value of Eop stored in memory 141 with the new value associated with the new MEP. For example, operation 542 may change value 12 uJ in memory 141 to 15.2 uJ.

After the new value associated with the new MEP is stored, decision logic 140 may repeat the process in order to find the next MEP (if any). For example, as shown in FIG. 5, decision logic 140 may hold (e.g., HOLD) the value of $ADJ_{VREF}$ after operation 542 in order to cause reference voltage generator 113 to hold the value of voltage $V_{REF}$ after it is changed to the value associated with the MEP. In this example, the value of $V_{REF}$ is held at 0.35V.

The example above assumes that a new MEP is found at Eop13. However, if no MEP is found, the value (e.g., 12 uJ) of Eop3 may remain in memory 141.

Thus, as described above, decision logic 140 may store at least three (e.g., three or more) consecutive values of Eops (e.g., Eop2, Eop3, and Eop4 or Eop12, Eop13, and Eop14) during the operation of find the MEP. This allows decision logic 140 to compare a present energy value with previous energy values in order to determine whether the initial (or a subsequent) MEP is found.

Finding a subsequent MEP is described as follows. After a value of an initial MEP is found and stored, decision logic 140 monitors (e.g., by comparing) the value of each subsequent Eop (which is an Eop generated after the initial MEP is found) relative to the stored value (e.g., 12 uJ) in order to determine whether there is a relatively significant energy surge that may (or may not) produce a new MEP. A significant energy surge may be a strong indicator of higher switching activities; thereby a new MEP may exist. Decision logic 140 may perform a downward tracking (e.g., downward searching) operation to find a new MEP if a relatively significant energy surge occurs. The downward tracking operation is similar to the operations associated with Eop2, Eop3, and Eop4.

For example, decision logic 140 may compare each subsequent Eop with an upper energy threshold E_upper=Eop_Stored+Eth. Component Eop_Stored is the value (e.g., 12 uJ) associated the MEP and is stored in memory 141. Component Eth is an energy threshold level having a selected value (e.g., a predetermined value) based on expected increased (or decrease) in the amount of energy at node 122 (FIG. 1) when some events may cause a significant energy surge (or drop) at node 122. The value of component Eth can be selected during design (e.g., before fabrication) of an IC chip that includes voltage controller 110. However, the value of component Eth may also be programmable (e.g., selected after fabrication of the IC chip that includes voltage controller 110). In the example of FIG. 5, the value of component Eth is assumed to be selected (e.g., set) at 5 uJ. Other values for component Eth may be used. Thus, in the example of FIG. 5, decision logic 140 monitors the value of Eop (generated after the initial MEP is found) in order to determine whether a particular average energy per operation (e.g., a surge) is greater than the value of E_upper (which is Eop_Stored+Eth). As shown in FIG. 5, Eop12 (0.40V)=17.6 uJ is greater than E_upper=12 uJ+5 uJ. Thus, in this example, decision logic 140 may follow the pattern of operations of decision logic 140 described above (e.g., Eop2, Eop3, and Eop4) and perform an upward tracking (e.g., upward searching) operation and determine that a new MEP is found. This new MEP is associated with Eop13 (0.35V)=15.2 uJ. Thus, as described above, decision logic 140 performs operation 542 to update the content of memory 141 with 15.2 uJ.

The example above describes operations where decision logic 140 detects whether there is a significant energy surge (e.g., whether a subsequent Eop>E_upper, where E_upper=Eop_Stored+Eth). However, decision logic 140 may also operate to detect whether there is significant energy drop that may (or may not) produce a new MEP. For example, decision logic 140 may detect whether a particular Eop is less than a lower energy threshold E_lower (e.g., whether a subsequent Eop<E_lower, where E_lower=Eop_Stored−Eth). Decision logic 140 may perform a downward tracking operation to find a new MEP if a relatively significant energy drop occurs.

Thus, as described above, decision logic 140 may receive the average energy per operation calculated by digital energy monitor 130 and dynamically adjust the value of voltage $V_{REF}$ in order to track the MEP of voltage controller 110 and load 115. The tracking of MEP may be performed without workload information (e.g., without input from load 115). Instead, the tracking of MEP may be based on monitoring whether a significant surge (or drop) in energy exceeds an energy threshold level (e.g., Eth).

Figure 6:
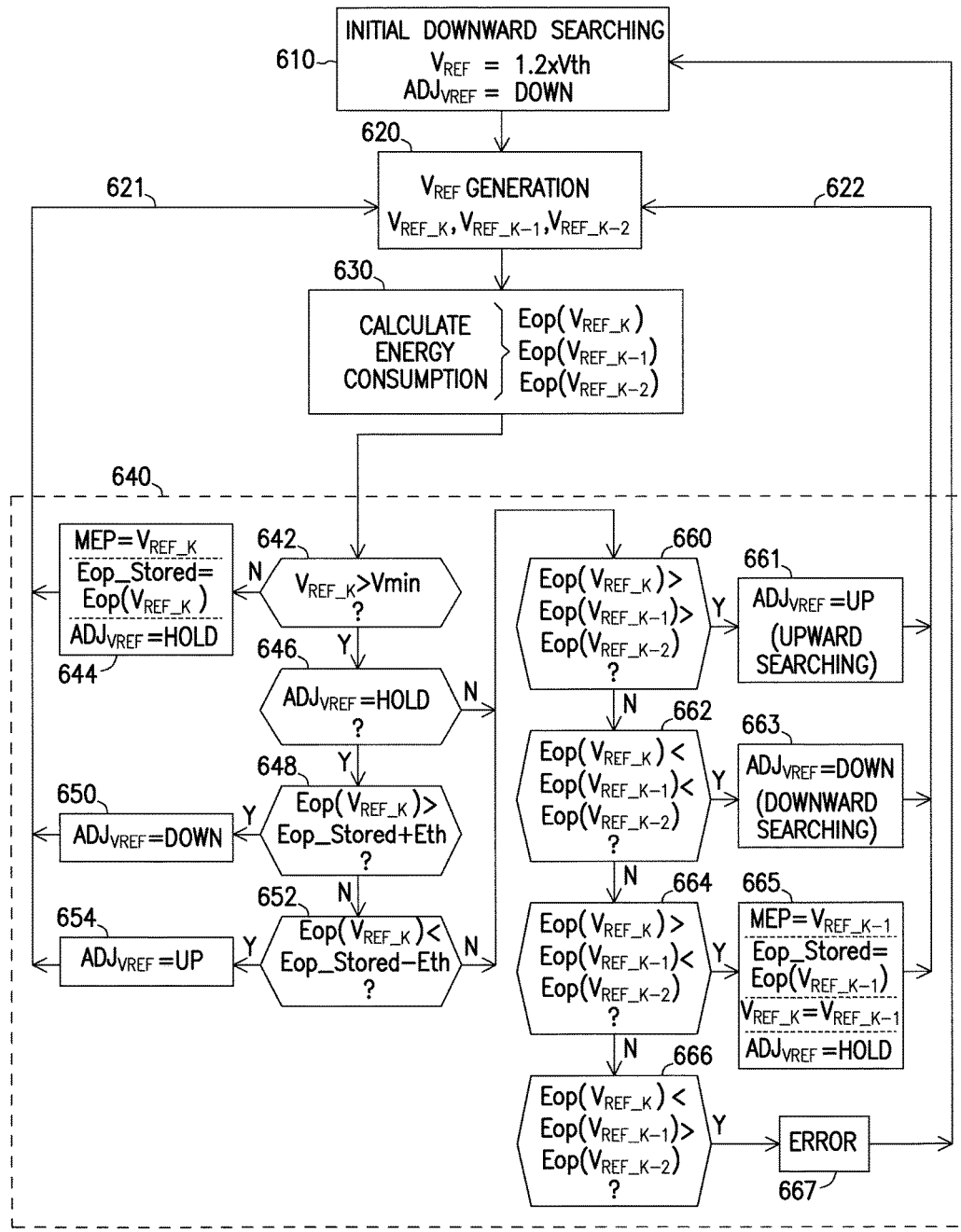
FIG. 6 is a flow diagram showing a method of determining MEP in a voltage controller and a load, according to some embodiments described herein.

FIG. 6 is a flow diagram showing a method 600 operating an electronic apparatus (e.g., a method of determining MEP in a voltage controller and a load), according to some embodiments described herein. The voltage controller and a load associated with method 600 can include voltage controller 110 and load 115 of apparatus 100 of FIG. 1. Method 600 may be performed by voltage controller 110 of FIG. 1. Some or all of activities in method 600 may be performed by hardware, software, or firmware, or any combination of hardware, software, and firmware.

As shown in FIG. 6, activity 610 of method 600 may include starting an initial search for the MEP voltage controller and a load. The initial search may include a downward searching operation. In activity 610, the value (e.g., initial value) of $V_{REF}$ may be set as $V_{REF}=1.2 \times V$th. The direction for the value of information $ADJ_{VREF}$ can be set to be in the DOWN direction (e.g., in order to perform an initial downward searching operation).

Activity 620 can include generating voltage $V_{REF}$. Activity 620 can be performed by a reference voltage generator (e.g., reference voltage generator 113 of FIG. 1). In FIG. 6, $V_{REF\_K}$, $V_{REF\_K-1}$, and $V_{REF\_K-2}$ represent three different values of voltage $V_{REF}$ generated by the reference voltage generator at three different times. For example, $V_{REF\_K-1}$ is generated after $V_{REF\_K}$ is generated, and $V_{REF\_K-2}$ is generated after $V_{REF\_K-1}$ is generated. $V_{REF}$ can be the present value of $V_{REF}$, $V_{REF\_K-1}$ can be the previous value (e.g., old value) of $V_{REF}$, and $V_{REF\_K-2}$ can be another previous value (oldest value) of $V_{REF}$ among $V_{REF\_K}$, $V_{REF\_K-1}$, and $V_{REF\_K-2}$.

Activity 620 can include controlling (e.g., increasing, decreasing, or keeping the same (or holding)) the value of $V_{REF}$ each time activity (e.g., routine) 621 or 622 is performed (described below). For example, activity 620 can hold the value of $V_{REF}$ if activity 621 or 622 is performed (described below) and if the value of $ADJ_{VREF}$ (described below) corresponds to the HOLD direction. In another example, activity 620 can decrease the value of $V_{REF}$ if activity 621 or 622 is performed and if the value of $ADJ_{VREF}$ corresponds to the DOWN direction. In another example, activity 620 can increase the value of $V_{REF}$ if activity 621 or 622 is performed and if the value of $ADJ_{VREF}$ corresponds to the UP direction. As an example, if $V_{REF\_K}$ is a present value, then activity 620 can generate a new $V_{REF\_K}$; the old $V_{REF\_K}$ becomes $V_{REF\_K-1}$ if activity 621 or 622 is performed and if the value of $ADJ_{VREF}$ corresponds to UP or DOWN direction. At a later time in this example, $V_{REF\_K-1}$ can become $V_{REF\_K-2}$ and the new $V_{REF}$ (previously generated) can become $V_{REF\_K-1}$ if activity 620 generates another new $V_{REF\_K}$ when activity 621 or 622 is performed and the value of $ADJ_{VREF}$ corresponds to UP or DOWN direction.

Activity 630 can include calculating energy consumption of the voltage controller and the load. Activity 630 can be performed by a digital energy monitor (e.g., digital energy monitor 130 of FIG. 1 and 430 of FIG. 4). Activity 630 can include calculating average energy per operation Eop at a particular value of voltage $V_{REF}$. FIG. 6 shows three different average energy per operations Eop ($V_{REF\_K}$), Eop ($V_{REF\_K-1}$), and Eop ($V_{REF\_K-2}$) that are calculated (e.g., sequentially) during three different evaluation periods at three different values of $V_{REF}$, respectively. Each evaluation period can be N cycles (e.g., 1000 cycles of the CLK signal). For example, activity 630 can calculate Eop ($V_{REF\_K}$) in N cycles, calculate Eop ($V_{REF\_K-1}$) in the next N cycles after Eop ($V_{REF\_K}$) is calculated, and then calculate Eop ($V_{REF\_K-2}$) in another N cycles after Eop ($V_{REF\_K-1}$) is calculated.

Eop ($V_{REF\_K}$) can be the present value of the average energy per operation, Eop ($V_{REF\_K-1}$) can be the previous value (e.g., old value) of the average energy per operation, and Eop ($V_{REF\_K-2}$) can be another previous value (oldest value) of the average energy per operation.

Method 600 can include portion 640 that can be performed by a decision logic (e.g., decision logic 140 of FIG. 1). Based on the average energy per operations (e.g., Eop ($V_{REF\_K}$), Eop ($V_{REF\_K-1}$), Eop ($V_{REF\_K-2}$)) calculated in activity 630, portion 640 of method 600 cause (e.g., by performing activity 621 or 622) activity 620 to adjust the value of $V_{REF}$ in order to determine the MEP in the voltage controller and load associated with method 600.

Activity 642 of portion 640 can include determining whether $V_{REF}>V\min$ (where Vmin can be the minimum value of an operating voltage (e.g., $V_{OUT}$) of the load).

In activity 642, if $V_{REF}>V\min$ is not true ($V_{REF}$ is not greater than Vmin, indicated as "N"), then the value of the MEP can be set to be the present value (e.g., $V_{REF\_K}$) of voltage $V_{REF}$. The MEP in activity 642, however, may or may not correspond to the local minima. Activity 644 can set Eop_Stored=Eop ($V_{REF\_K}$), where Eop_Stored is the value (e.g., in uJ unit) stored in a memory (e.g., such as memory 141 of FIG. 5). In this case, activity 644 can also set the value of information $ADJ_{VREF}$ to be corresponding to the HOLD direction in order to cause (through activity 621) activity 620 to hold the value of $V_{REF}$ at $V_{REF\_K}$.

In activity 642, if $V_{REF}>V\min$ is true ($V_{REF}$ is greater than Vmin, indicated as "Y"), method 600 can continue with activity 646, which can check whether $ADJ_{VREF}$=HOLD.

In activity 646, if $ADJ_{VREF}$=HOLD is not true, method 600 can continue with at least one of activities 660 through 667, as described below.

In activity 646, if $ADJ_{VREF}$=HOLD is true (indicated as "Y"), method 600 can continue with activity 648.

Activity 648 can check whether Eop ($V_{REF\_K}$)> Eop_Stored+Eth. As described above, component Eth is an energy threshold level used to determine whether a significant energy surge (or drop) may occur. In activity 648, if Eop ($V_{REF\_K}$)>Eop_Stored+Eth is true (indicated as "Y"), method 600 can continue with activity 650 to set $ADJ_{VREF}$=DOWN to cause (through activity 621) activity 620 to decrease the value of $V_{REF}$. If Eop ($V_{REF\_K}$)> Eop_Stored+Eth is not true (indicated as "N"), method 600 can continue with activity 652.

Activity 652 can check whether Eop ($V_{REF\_K}$)< Eop_Stored−Eth. If Eop ($V_{REF\_K}$)<Eop_Stored+Eth is true (indicated as "Y"), method 600 can continue with activity 654 to set $ADJ_{VREF}$=UP to cause (through activity 621) activity 620 to increase the value of $V_{REF}$. If Eop ($V_{REF\_K}$)<Eop_Stored−Eth is not true (indicated as "N"), method 600 can continue with at least one of activities 660 through 667.

Method 600 can perform activities 660 through 667 to find the MEP of the voltage controller and the load. For example, method 600 can perform activities 660 through 665 to compare the values of different average energy per operations Eop ($V_{REF\_K}$), Eop ($V_{REF\_K-1}$), and Eop ($V_{REF\_K-2}$).

Based on the results of the comparisons, if the MEP is not found, method 600 can cause the value of $V_{REF}$ to increase or decrease and continue searching for the MEP. As shown in FIG. 6, method 600 may perform either an upward searching operation (e.g., based on the value of $ADJ_{VREF}$=UP in activity 661) or a downward searching operation (e.g., based on the value of $ADJ_{VREF}$=DOWN in activity 663).

In activity 665, when the MEP is found (which can correspond to the local minima), activity 665 can set Eop_Stored=Eop ($V_{REF\_K-1}$), where Eop ($V_{REF\_K-1}$) is the previous average energy per operation. Setting Eop_Stored=Eop ($V_{REF\_K-1}$) can include updating the stored value of average energy per operation value in memory (e.g., memory 141) with a new value of average energy per operation.

In activity 665, when the MEP is found, activity 665 can also set $V_{REF\_K}=V_{REF\_K-1}$ (e.g., by setting the value of information $ADJ_{VREF}$ to be corresponding to the UP direction, not shown in activity 665). After setting $V_{REF\_K}=V_{REF\_K-1}$ (e.g., after setting the value of information $ADJ_{VREF}$ to be corresponding to the UP direction), activity 665 can set the value of information $ADJ_{VREF}$ to be corresponding to the HOLD direction, as shown in activity 665. After the MEP is found in activity 665, method 600 can continue searching for another MEP through activity 622 and repeat the activities of method described above.

As shown in FIG. 600, method 600 can include activity 667 to indicate that an error occurs and then executes the initial search (e.g., downward search in activity 610). For example, if the condition in activity 666 is true (indicated by Y), method 600 can continue with activity 667 and then go to activity 610 and execute the initial search in activity 610 and other activities of method 600, as described above.

Method 600 can include additional activities (e.g., operations) of a memory device described above with reference to FIG. 1 through FIG. 5.

The illustrations of apparatus (e.g., apparatus 100) and methods (e.g., method 600, and the operations of voltage controller 110 described above with reference to FIG. 1 through FIG. 5) are intended to provide a general understanding of the structure of various embodiments and are not intended to provide a complete description of all the elements and features of apparatuses that might make use of the structures described herein.

The apparatus (e.g., apparatus 100) described herein may include or be included in electronic circuitry, such as high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 5) players), vehicles, medical devices (e.g., heart monitor, blood pressure monitor, etc.), set top boxes, and others.

Additional Notes and Examples

Example 1 includes subject matter (such as a device, an electronic apparatus (e.g., circuit, electronic system, or both), or a machine) including a power switching unit to receive a first voltage and provide a second voltage having a value based on a value of the first voltage, a first loop to provide digital control information to control a switching of the power switching unit in order to maintain a relationship between a value of the second voltage and a value of a reference voltage, and a second loop coupled to the power switching unit and the first loop to calculate a value of energy consumption of at least a portion of the apparatus based at least on the digital control information.

In Example 2, the subject matter of Example 1 may optionally include, wherein the power switching unit is included in a low-drop out (LDO) voltage controller, and the first and second loops are embedded in the LDO voltage controller.

In Example 3, the subject matter of Example 1 may optionally include, wherein the second loop is arranged to adjust the value of the reference voltage based on the value of the energy consumption.

In Example 4, the subject matter of Example 1 may optionally include, wherein the second loop is arranged to adjust the value of the reference voltage based on the value of the energy consumption in order to track minimum energy point (MEP) of the portion of the apparatus.

In Example 5, the subject matter of any of Examples 1-4 may optionally include, wherein the value of the energy consumption is an average energy per cycle of a total energy consumption calculated over a number of cycles of a clock signal clock.

In Example 6, the subject matter of any of Examples 1-2 may optionally include, wherein the second loop is arranged to find a minimum energy point (MEP) based on the value of the energy consumption.

In Example 7, the subject matter of any of Examples 1-2 may optionally include, wherein the second loop is arranged to perform math operations to calculate the value of the energy consumption, the math operations including a subtraction operation.

In Example 8, the subject matter of any of Examples 1-2 may optionally include, wherein the second loop is arranged to change the value of the reference voltage from a first value to a second value, and the first loop is arranged to maintain the relationship between the value of the second voltage with each of the first and second values of the reference voltage.

Example 9 includes subject matter (such as a device, an electronic apparatus (e.g., circuit, electronic system, or both), or a machine) including a first node to receive a first voltage having a first value, a second node to provide a second voltage having a second value less than the first value, a power switching unit coupled between the first and second nodes, a comparator to provide information based on a comparison between the second value and a value of a reference voltage, a control unit to provide digital control information based on the information provided by the comparator to control the power switching unit, a digital energy monitor to calculate a value of energy consumption of at least a portion of the apparatus based on digital values derived from at least the first value and a value of the digital control information from the control unit, and a decision logic to adjust the value of the reference voltage based on the value of the energy consumption.

In Example 10, the subject matter of Example 9 may optionally include, wherein the decision logic is arranged to track a minimum energy point (MEP) of the at least a portion of the apparatus based on the value of the energy consumption.

In Example 11, the subject matter of any of Examples 9-10 may optionally include, wherein the power switching unit include transistors arranged in parallel between the first and second nodes.

In Example 12, the subject matter of Example 11 may optionally include, wherein the control unit is arranged to provide digital information including bits, and each of the bits is provided to a gate of a respective transistor among the transistors.

In Example 13, the subject matter of any of Examples 9-10 may optionally include, wherein the digital energy monitor includes circuitry to perform math operations to calculate the value of the energy consumption.

In Example 14, the subject matter of Example 9 may optionally include, wherein the decision logic is arranged to cause the value of the reference voltage to change from one value to another value based on a minimum energy point (MEP) associated with the value of the energy consumption.

In Example 15, the subject matter of Example 9 may optionally include, wherein the decision logic is arranged to perform an operation to find a minimum energy point (MEP) based on the value of the energy consumption, and to change the value of the reference voltage one value to another value when the MEP is found.

In Example 16, the subject matter of any of Examples 9-10 may optionally include, further comprising a die, wherein the power switching unit, the comparator, the control unit, the digital energy monitor, and the decision logic are included in the die.

Example 17 includes subject matter (such as a device, an electronic apparatus (e.g., circuit, electronic system, or both), or a machine) including a processing unit, and a low-drop out (LDO) voltage controller coupled to the processing core, the low-drop out voltage controller including a power switching unit to receive a first voltage and provide a second voltage having a value based on a value of the first voltage, a first loop to provide digital control information to control a switching of the power switching unit in order to maintain a relationship between the value of the second voltage and a value of a reference voltage, and a second loop coupled to the power switching unit and the first loop to calculate a value of energy consumption of at least a portion of the apparatus based at least on the digital control information.

In Example 18, the subject matter of Example 17 may optionally include, wherein further comprising a die, wherein the processing unit and the LDO voltage controller are included in the die.

In Example 19, the subject matter of Example 17 may optionally include, further comprising a die, wherein the LDO voltage controller is included in the die, and the processing unit is located outside the die.

In Example 20, the subject matter of any of Examples 17-19 may optionally include, wherein the second loop is arranged to adjust the value of the reference voltage based on the value of the energy consumption.

Example 21 includes subject matter (such as a method of operating a device, an electronic apparatus (e.g., circuit, electronic system, or both), or a machine) including receiving digital values at a digital energy monitor of a low-drop out (LDO) voltage controller, the LDO voltage controller including transistors coupled in parallel between a first node and a second node of the LDO voltage controller, maintaining a relationship between a voltage at the second node and a reference voltage, calculating a value of energy consumption of operation consumed by at least a load coupled to the second node based on the digital values, and adjusting a value of a reference voltage based on the value of energy consumption to track a minimum energy point (MEP) associated with at least the load.

In Example 22, the subject matter of Example 21 may optionally include, wherein calculating the value of the energy consumption includes calculating a number of average energy per operation.

In Example 23, the subject matter of any of Examples 21-22 may optionally include, wherein finding the MEP including storing a first value of energy consumption if a first MEP is found, and replacing the first value of energy consumption with a second value of energy consumption if a second MEP is found.

In Example 24, the subject matter of any of Examples 21-22 may optionally include, wherein adjusting the value of the reference voltage includes comparing the value of energy consumption with a stored value of energy consumption, and changing the value of the reference voltage if a difference between the value of the energy consumption and the stored value of energy consumption exceed a selected value.

In Example 25, the subject matter of any of Examples 21-22 may optionally include, wherein adjusting the value of the reference voltage includes changing the value of the reference voltage from a first value to a second value, wherein the first value is less than the second value.

In Example 26, the subject matter of any of Examples 21-22 may optionally include, wherein adjusting the value of the reference voltage includes changing the value of the reference voltage from a first value to a second value, wherein the first value is greater the second value.

Example 27 includes subject matter (such as a device, an electronic apparatus (e.g., circuit, electronic system, or both), or machine) including means for performing any of the methods of examples 21-26.

The subject matter of Example 1 through Example 27 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus comprising:
a power switching unit to receive a first voltage and provide a second voltage having a value based on a value of the first voltage;
a first loop to provide digital control information to control a switching of the power switching unit in order to maintain a relationship between a value of the second voltage and a value of a reference voltage; and
a second loop coup led to the power switching unit and the first loop to receive the digital control information from the first loop and to calculate a value of energy consumption of at least a portion of the apparatus based at least on the digital control information, wherein the power switching unit is included in a low-drop out (LDO) voltage controller, and the first and second loop s are embedded in the LDO voltage controller.

2. The apparatus of claim 1, wherein the second loop is arranged to adjust the value of the reference voltage based on the value of the energy consumption.

3. The apparatus of claim 1, wherein the second loop is arranged to adjust the value of the reference voltage based on the value of the energy consumption in order to track minimum energy point (MEP) of the portion of the apparatus.

4. The apparatus of claim 1, wherein the value of the energy consumption is an average energy per cycle of a total energy consumption calculated over a number of cycles of a clock signal clock.

5. The apparatus of claim 1, wherein the second loop is arranged to find a minimum energy point (MEP) based on the value of the energy consumption.

6. The apparatus of claim 1, wherein the second loop is arranged to perform math operations to calculate the value of the energy consumption, the math operations including a subtraction operation.

7. The apparatus of claim 1, wherein the second loop is arranged to change the value of the reference voltage from a first value to a second value, and the first loop is arranged to maintain the relationship between the value of the second voltage with each of the first and second values of the reference voltage.

8. An apparatus comprising:
a first node to receive a first voltage having a first value;
a second node to provide a second voltage having a second value less than the first value;
a power switching unit coupled between the first and second nodes;
a comparator to provide information based on a comparison between the second value and a value of a reference voltage;
a control unit to provide digital control information based on the information provided by the comparator to control the power switching unit;
a digital energy monitor to calculate a value of energy consumption of at least a portion of the apparatus based on digital values derived from at least the first value and a value of the digital control information from the control unit; and
a decision logic to adjust the value of the reference voltage based on the value of the energy consumption, wherein the Dower switching unit, the comparator, the control unit, the digital energy monitor, and the decision logic are included in a low-drop out (LDO) voltage controller.

9. The apparatus of claim 8, wherein the decision logic is arranged to track a minimum energy point (MEP) of the at least a portion of the apparatus based on the value of the energy consumption.

10. The apparatus of claim 8, wherein the power switching unit includes transistors arranged in parallel between the first and second nodes.

11. The apparatus of claim 10, wherein the control unit is arranged to provide digital information including bits, and each of the bits is provided to a gate of a respective transistor among the transistors.

12. The apparatus of claim 8, wherein the digital energy monitor includes circuitry to perform math operations to calculate the value of the energy consumption.

13. The apparatus of claim 8, wherein the decision logic is arranged to cause the value of the reference voltage to change from one value to another value based on a minimum energy point (MEP) associated with the value of the energy consumption.

14. The apparatus of claim 8, wherein the decision logic is arranged to perform an operation to find a minimum energy point (MEP) based on the value of the energy consumption, and to change the value of the reference voltage one value to another value when the MEP is found.

15. The apparatus of claim 8, further comprising a die, wherein the power switching unit, the comparator, the control unit, the digital energy monitor, and the decision logic are included in the die.

16. An apparatus comprising:
a processing unit; and
a low-drop out (LDO) voltage controller coupled to the processing core, the low-drop out voltage controller including:
a power switching unit to receive a first voltage and provide a second voltage having a value based on a value of the first voltage;
a first loop to provide digital control information to control a switching of the power switching unit in order to maintain a relationship between the value of the second voltage and a value of a reference voltage; and
a second loop coupled to the power switching unit and the first loop to receive the digital control information from the first loop and to calculate a value of energy consumption of at least a portion of the apparatus based at least on the digital control information.

17. The apparatus of claim 16, further comprising a die, wherein the processing unit and the LDO voltage controller are included in the die.

18. The apparatus of claim 16, further comprising a die, wherein the LDO voltage controller is included in the die, and the processing unit is located outside the die.

19. The apparatus of claim 16, wherein the second loop is arranged to adjust the value of the reference voltage based on the value of the energy consumption.

* * * * *

UNITED STATES PATENT AND TRADEMARK OFFICE
CERTIFICATE OF CORRECTION

PATENT NO. : 10,108,212 B2  
APPLICATION NO. : 14/861997  
DATED : October 23, 2018  
INVENTOR(S) : Park et al.

Page 1 of 1

It is certified that error appears in the above-identified patent and that said Letters Patent is hereby corrected as shown below:

In the Claims

Column 19, Line 48, Claim 1, delete "coup led" and insert --coupled-- therefor

Column 19, Lines 54-55, Claim 1, delete "loop s" and insert --loops-- therefor

Column 20, Line 34, Claim 8, delete "Dower" and insert --power-- therefor

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*